(12) United States Patent
Korcz et al.

(10) Patent No.: US 10,050,427 B2
(45) Date of Patent: Aug. 14, 2018

(54) CABLE CONNECTOR AND ELECTRICAL BOX

(71) Applicant: HUBBELL INCORPORATED, Shelton, CT (US)

(72) Inventors: Krzysztof W. Korcz, Grainger, IN (US); Steven J. Johnson, Buchanan, MI (US); Richard J. Wagner, South Bend, IN (US); Jason P. Thomas, Mesa, AZ (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/700,780

(22) Filed: Sep. 11, 2017

(65) Prior Publication Data

US 2017/0373477 A1    Dec. 28, 2017

Related U.S. Application Data

(60) Division of application No. 15/401,383, filed on Jan. 9, 2017, now Pat. No. 9,762,042, which is a
(Continued)

(51) Int. Cl.
*H02G 3/18* (2006.01)
*H02G 3/08* (2006.01)

(52) U.S. Cl.
CPC ................... *H02G 3/083* (2013.01)

(58) Field of Classification Search
CPC ........ H02G 3/22; H02G 3/0691; H02G 3/083; H02G 3/18; H02G 15/16; H02G 3/28;
(Continued)

(56) References Cited

U.S. PATENT DOCUMENTS 1,772,241 A * 8/1930 Calderwood ........ H02G 3/0683
220/3.2
1,914,635 A * 6/1933 Goetzelman ......... H02G 3/0683
174/668
(Continued)

OTHER PUBLICATIONS

International Search Report and Written Opinion issued by The International Searching Authority, dated Sep. 14, 2015. The International Search Report issued in PCT Application No. PCT/US15/34526, filed Jun. 5, 22015.
(Continued)

*Primary Examiner* — Angel R Estrada
(74) *Attorney, Agent, or Firm* — Dickinson Wright PLLC

(57) ABSTRACT

A cable connector is provided for coupling to and mounted within the internal cavity of an electrical box for securing an electrical cable passing through an opening in the electrical box. The cable connector includes a housing having a first end positioned next to or adjacent the cable opening in the electrical box and a second end spaced from the first end and the cable opening. At least one and typically two cable retaining members are positioned in the cable opening of the housing between the front wall and the rear wall. The cable retainer has a body with a plurality of retaining arms extending into an axial passage of the body for gripping the outer surface of a cable.

25 Claims, 11 Drawing Sheets

Related U.S. Application Data continuation of application No. 14/731,615, filed on Jun. 5, 2015, now Pat. No. 9,559,506.

(60) Provisional application No. 62/008,804, filed on Jun. 6, 2014.

(58) Field of Classification Search
CPC .......... H02G 3/30; H02G 3/0616; H02G 3/02; H02G 3/0666; H02G 3/0683; H05K 5/0247; H05K 5/02; H01R 13/512; H01R 4/36; H01R 4/64; H01R 13/743; H01R 13/74; H01R 13/73
USPC ...... 174/650, 652, 653, 655, 659, 668, 68.1, 174/68.3, 60, 64; 248/49, 68.1, 74.2, 71; 285/154.3, 195, 154.4
See application file for complete search history.

(56) References Cited

U.S. PATENT DOCUMENTS

| | | |
|---|---|---|
| 2,444,092 A | 6/1948 | Clayton |
| 2,708,122 A | 5/1955 | Clark |
| 3,006,661 A | 10/1961 | McNeill |
| 4,277,641 A | 7/1981 | Bauer et al. |
| 4,316,999 A | 2/1982 | Nattel |
| 4,724,282 A | 2/1988 | Troder |
| 4,922,057 A | 5/1990 | Ross |
| 5,013,872 A * | 5/1991 | Lockwood ........... H02G 3/0691 174/663 |
| 5,831,213 A | 11/1998 | Wright et al. |
| 6,043,432 A | 3/2000 | Gretz |
| 6,064,009 A | 5/2000 | Jorgensen et al. |
| 6,957,968 B1 | 10/2005 | Gretz |
| 7,057,107 B2 * | 6/2006 | Auray .................. H02G 3/0691 174/657 |
| 7,205,489 B2 | 4/2007 | Auray et al. |
| 7,304,251 B1 | 12/2007 | Gretz |
| 7,390,979 B1 | 6/2008 | Johnson |
| 7,582,829 B2 | 9/2009 | Yan |
| 9,252,578 B2 * | 2/2016 | Korcz .................. H02G 3/0691 |
| 2006/0141827 A1 | 6/2006 | Auray et al. |
| 2007/0079983 A1 | 4/2007 | Pyron |
| 2012/0024596 A1 | 2/2012 | DiLillo et al. |
| 2014/0080346 A1 | 4/2014 | Lu et al. |

OTHER PUBLICATIONS

International Preliminary Report on Patentability dated Dec. 6, 2016 which issued in the counterpart Application No. PCT/US2015/034526.

* cited by examiner

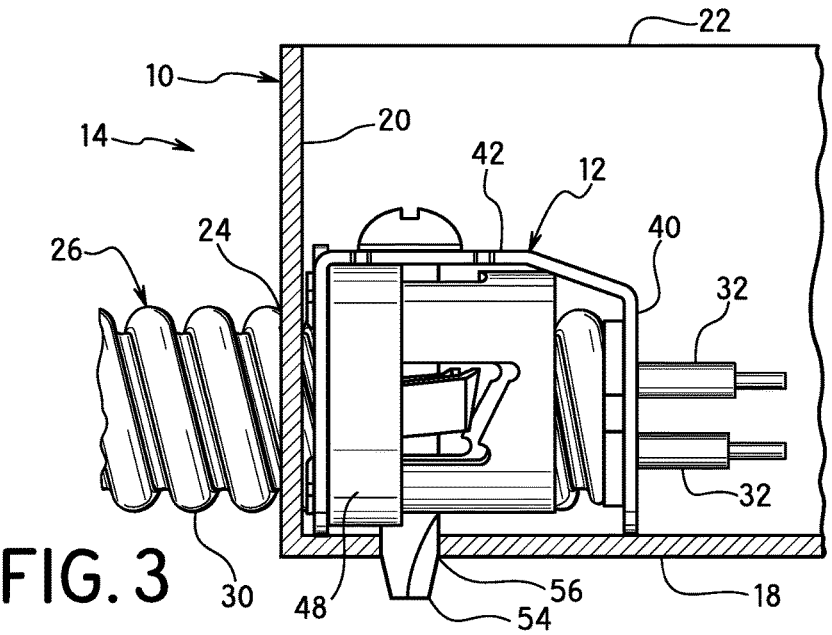
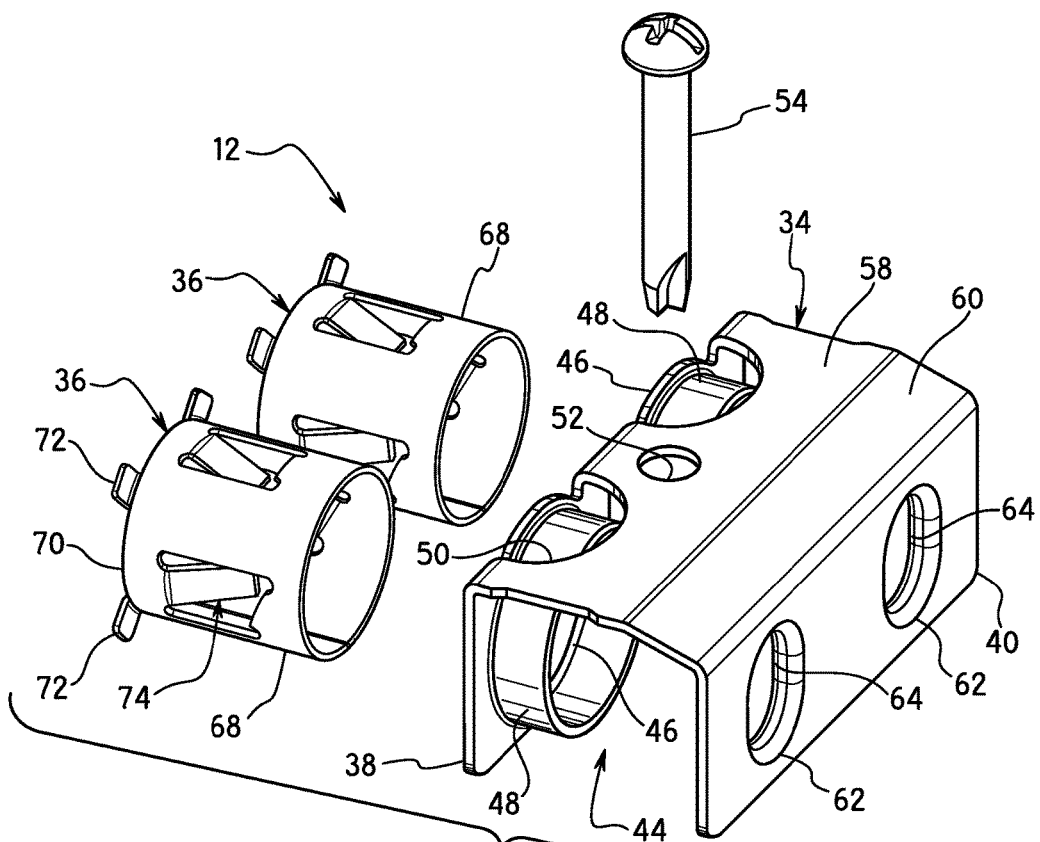

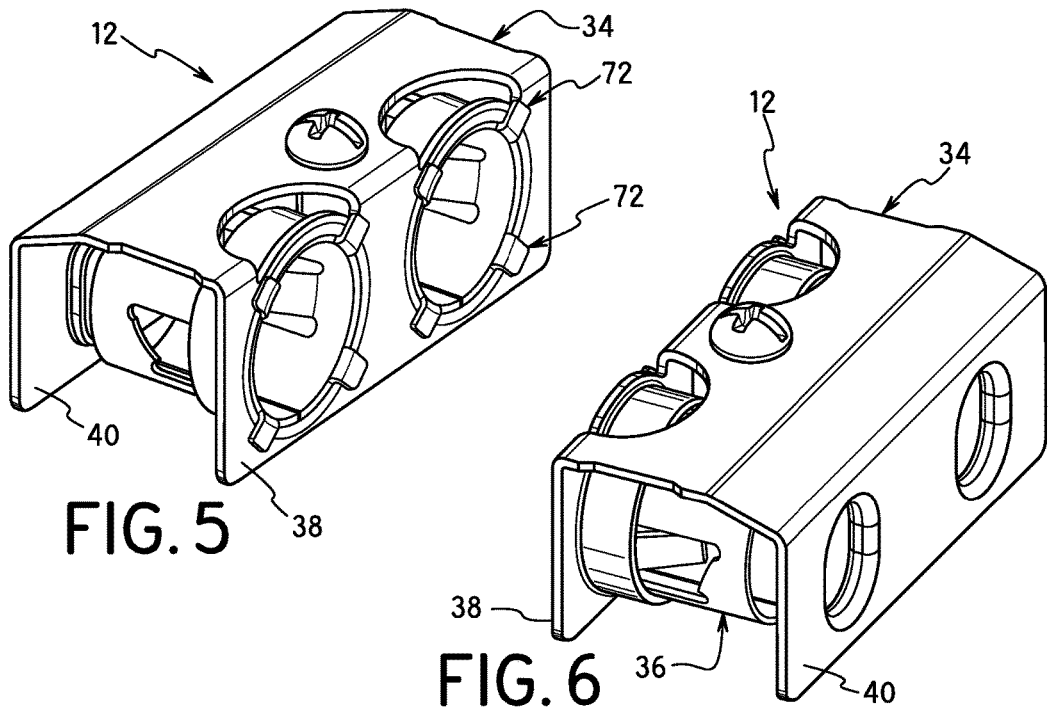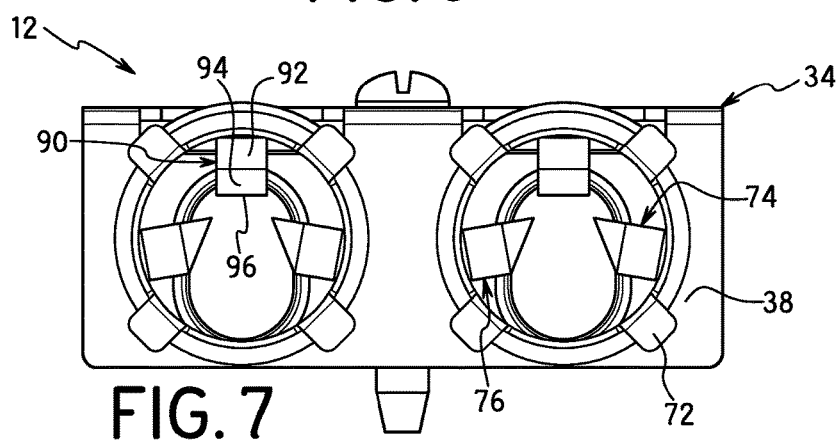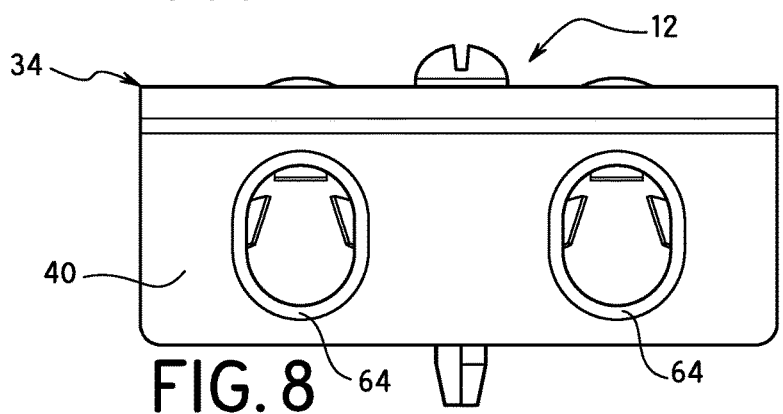

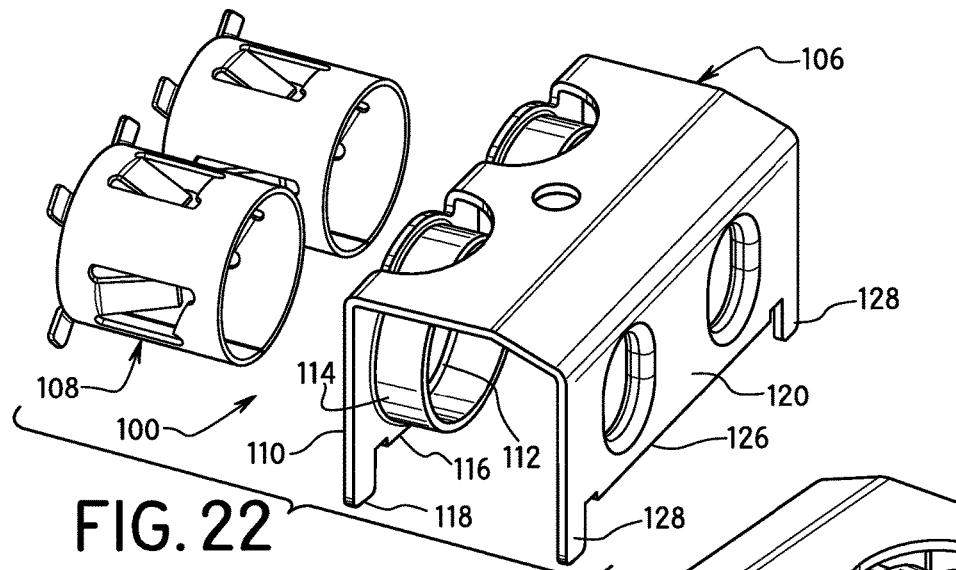
FIG. 22
FIG. 23
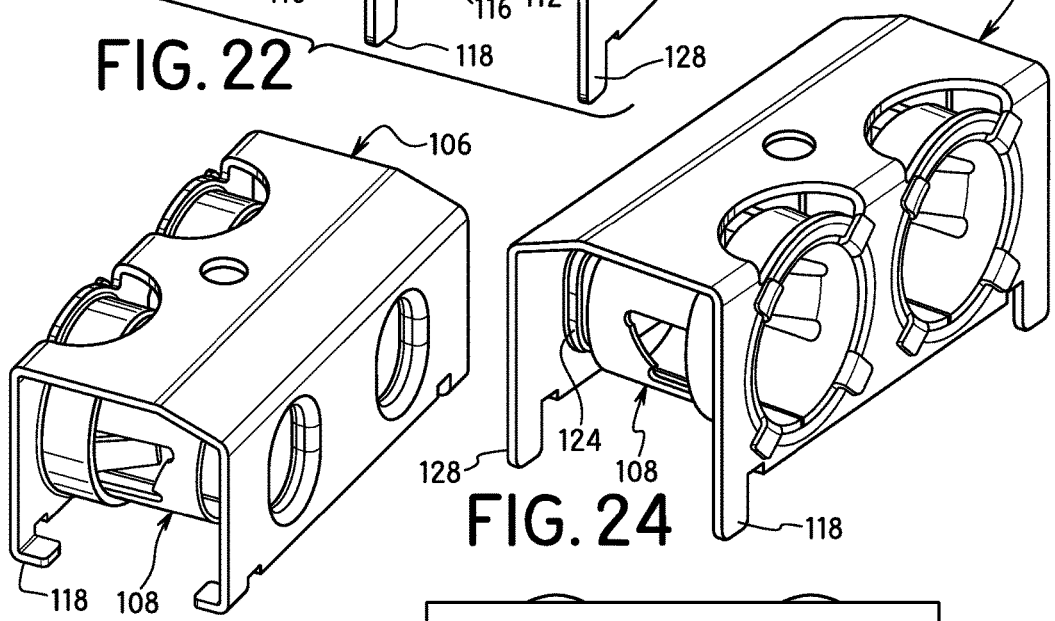
FIG. 24
FIG. 25
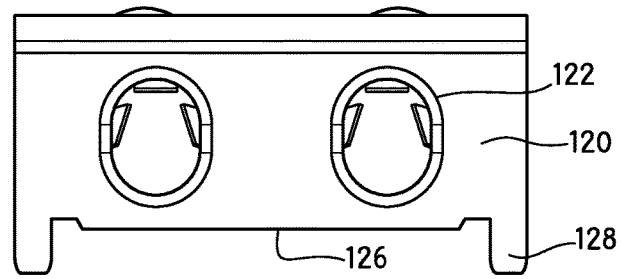
FIG. 26
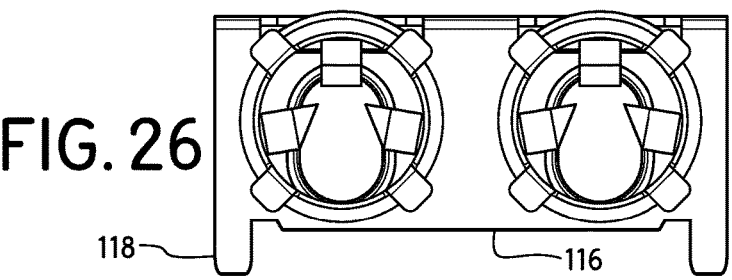

CABLE CONNECTOR AND ELECTRICAL BOX

This application is a divisional application of U.S. Continuation patent application Ser. No. 15/401,383, filed Jan. 9, 2017, which is based on U.S. Continuation patent application Ser. No. 14/731,615, filed Jun. 5, 2015 (U.S. Pat. No. 9,559,506, Issued Jan. 31, 2017), which claims the benefit of U.S. Provisional Patent Application No. 62/008,804, filed Jun. 6, 2014, the entire contents of which are incorporated herein by reference.

FIELD OF THE INVENTION

The present invention is directed to an electrical box assembly having a cable connector for securing a cable to the electrical box. The invention is particularly directed to an electrical box having a cable connector coupled to the electrical box where the connector provides a connection for a metallic cable directly to the electrical box.

BACKGROUND OF THE INVENTION

Electrical cables are commonly supplied to an electrical junction box for connecting the cable to electrical fixtures or other electrical cables. The cables generally pass through an opening in the wall of the electrical box and are secured in place by a suitable clamp. Conventional cable clamps generally clamp the cable between the clamping plate and a side wall or bottom wall of the electrical box. This type of clamping arrangement generally relies on the smooth surface of the wall of the electrical box that does not adequately grip the cable.

Cable clamps are produced which are able to accommodate metal armor cable and plastic sheath cables. These devices include a stop member for the metal sheath to prevent the metal sheath from extending into the electrical box. Various clamping devices are known for clamping the electrical cable. Many of these cable clamps are mounted to the cable and then inserted into the opening in the electrical box so that at least a portion of the clamp projects outwardly from the outer surface of the electrical box.

One example of an electrical cable clamp is disclosed in U.S. Pat. No. 4,316,999 to Nattel which discloses an electrical wiring box and cable clamp where the cable clamp is attached to the wall of the electrical box. The cable clamp is a flexible member that overlies the opening in the electrical box bottom edge of the leg portions including upwardly turned flanges. The bottom wall of the electrical box includes ridges or score lines for engaging the nonmetallic cable.

U.S. Pat. No. 4,922,057 to Ross discloses an electrical box having a flexible flat retaining member attached to the inner face of the side wall of the electrical box. As shown in FIG. 2, the flat retaining member flexes to grip the surface of the cable passing through the opening in the electrical box.

U.S. Pat. No. 4,724,282 to Troder discloses a nonmetallic electrical box having a flexible metal cable retaining member attached to the inner face of the electrical box. The retaining member flexes when the cable is passed through the opening to grip the cable.

U.S. Pat. No. 4,277,641 to Bauer et al. discloses a nonmetallic electrical box having a cable clamp member that is inserted into the cavity of the electrical box. The cable clamp member includes an outer frame and a flexible flap. The flexible flaps bend upon insertion of the electrical cable through the opening in the frame to grip the cable.

U.S. Patent Publication No. 2012/0024596 to DiLillo et al. discloses a plastic cable clamp adapted for mounting in one of the openings in the electrical box. The cable clamp includes one or more flexible members capable of clamping the nonmetallic cable. In one embodiment, the cable clamp includes flexible legs that can bend inwardly upon insertion of the cable to grip the outer surface of the cable.

While the prior cable clamps and connectors are generally suitable for the intended use, there is a continuing need in the industry for improved cable clamps and connectors.

SUMMARY OF THE INVENTION

The present invention is directed to the electrical box assembly for securely coupling an electrical cable to the electrical box. The invention is directed to a preassembled electrical box assembly where the cable connector can be fixed to the electrical box. The cable connector of the invention is particularly suitable for connecting an armor clad or metal sheath cable to an electrical box without requiring the manual tightening of adjustment of screws or manipulation of other fasteners.

One feature of the present invention is to provide a cable connector where the cable, such as a metal armor clad cable, can be inserted into the cable connector to grip the surface of the cable to prevent removal of the cable.

The cable connector of the invention includes a housing having a front wall attached to the electrical box where the front wall has an opening aligned with an opening in the wall of the electrical box. The cable retainer is positioned within the housing for gripping the outer surface of the cable.

The cable connector in one embodiment of the invention has a housing with a wall having a cable opening aligned with an opening in the side wall of the electrical box. A cable retainer has an axial passage for receiving electrical cable and is positioned in the cable opening of the wall. The cable retainer has at least one and typically a plurality of inwardly extending spring biased retaining arms allowing the electrical cable to slide into the cable retainer and to capture the cable to prevent the cable from pulling out from the cable retainer and the electrical box.

The cable connector in one embodiment has a wall adjacent to the side wall of the electrical box where the side wall of the electrical box has an opening for receiving a cable. A cable retainer can be received in a cable opening of the wall of the cable connector or coupled to a surface of the cable connector. The cable retainer has a substantially cylindrical body with a front end having outwardly extending tabs that contact the outer surface of the wall of the cable connector. The outwardly extending tabs prevent the cable retainer from sliding completely through the opening into the wall of the cable connector and into the cavity of the electrical box. The tabs are captured between the side wall of the electrical box and the front wall of the housing of the cable retainer to prevent axial movement of the cable retainer. In one embodiment, the cable connector has housing defined by a front wall, a rear wall and a connecting wall extending between the front wall and rear wall.

One aspect of the present invention provides a two piece cable connector that can be coupled to an electrical box. The cable connector includes a wall with a cable passage and a cable retainer received in the cable passage of the housing. The cable retainer can be received in the cable opening of the housing to receive the cable. At least one retaining arm extends into the cable passage of the cable retainer to grip the outer surface of the cable to prevent removal of the cable. A first end of the cable retainer has outwardly extending tabs captured between the side wall of the electrical box and the housing of the cable connector to retain the cable retainer within the housing.

A further feature of the invention is to provide a cable retainer having a housing with a cable opening and a collar extending from the housing around the cable opening. An annular coil spring is received in the passage of the collar. A cable is inserted through the collar and a central opening of the annular spring. The spring engages the outer surface of the cable in the recess or valley between the adjacent corrugations and wedges between the collar and the cable to prevent removal of the cable.

Another feature of the invention provides a cable connector having a housing with a top wall having a slot. A cable retainer is received in the slot and slides between a retracted position and an inward position to grip the cable received in a passage of the housing. The cable retainer has a central opening for the cable defined by two spaced apart arms. The cable retainer is pushed downward where the arms slide around the cable so that the arms grip the outer surface and retain the cable in place.

These and other aspects of the invention are basically attained by providing a cable connector for coupling a cable to an electrical box. The cable connector includes wall with a cable opening forming a cable passage. The wall is configured for coupling to an electrical box. A cable retainer is received in the opening in the wall. The cable retainer has a body with a cable passage for receiving the electrical cable. The cable retainer is configured for gripping an outer surface of the cable and retaining the cable within the cable passage of the cable retainer. In one embodiment, the connector has front wall, a rear wall and a connecting wall extending between the front wall and the rear wall.

The various features and advantages of the invention are further attained by providing an electrical box assembly comprising an electrical box having a rear wall and a side wall where the side wall has at least one cable opening with a dimension for receiving a cable. A cable connector is coupled to the electrical box for coupling an electrical cable to the electrical box. The cable connector comprises a front wall with a cable opening forming a cable passage for receiving the cable. The wall is coupled to the electrical box where the cable opening in the wall is aligned with the cable opening in the electrical box. A cable retainer is received in the passage. The cable retainer has a body with an axial passage for receiving the electrical cable. The body has at least one retaining arm oriented for gripping an outer surface of the cable.

The features of the invention are further attained by providing a cable retainer comprising a housing having a front wall with an opening defining a cable passage extending through the front wall. A cable retainer is coupled to the housing and has a cable passage aligned with the cable passage of the housing. The cable retainer has at least spring biased arm extending into the cable passage of the cable retainer for gripping and securing the cable The features of the invention will become apparent from the following detailed description of the invention and the annexed drawings which disclose various embodiments of the invention.

BRIEF DESCRIPTION OF THE DRAWINGS

The following is a brief description of the drawings in which:

FIG. 3 is a cross-sectional side view of the cable connector and electrical box;
FIG. 4 is an exploded view of the cable connector;
FIG. 5 is a front perspective view of the cable connector;
FIG. 6 is a rear perspective view of the cable connector;
FIG. 7 is a front view of the cable connector;
FIG. 8 is a rear view of the cable connector;
FIG. 22 is an exploded view of the cable connector;
FIG. 23 is a perspective view of the cable connector;
FIG. 24 is a front perspective view of the cable connector;
FIG. 25 is a rear view of the cable connector;
FIG. 26 is a front view of the cable connector.

DESCRIPTION OF THE INVENTION

Figure 1:
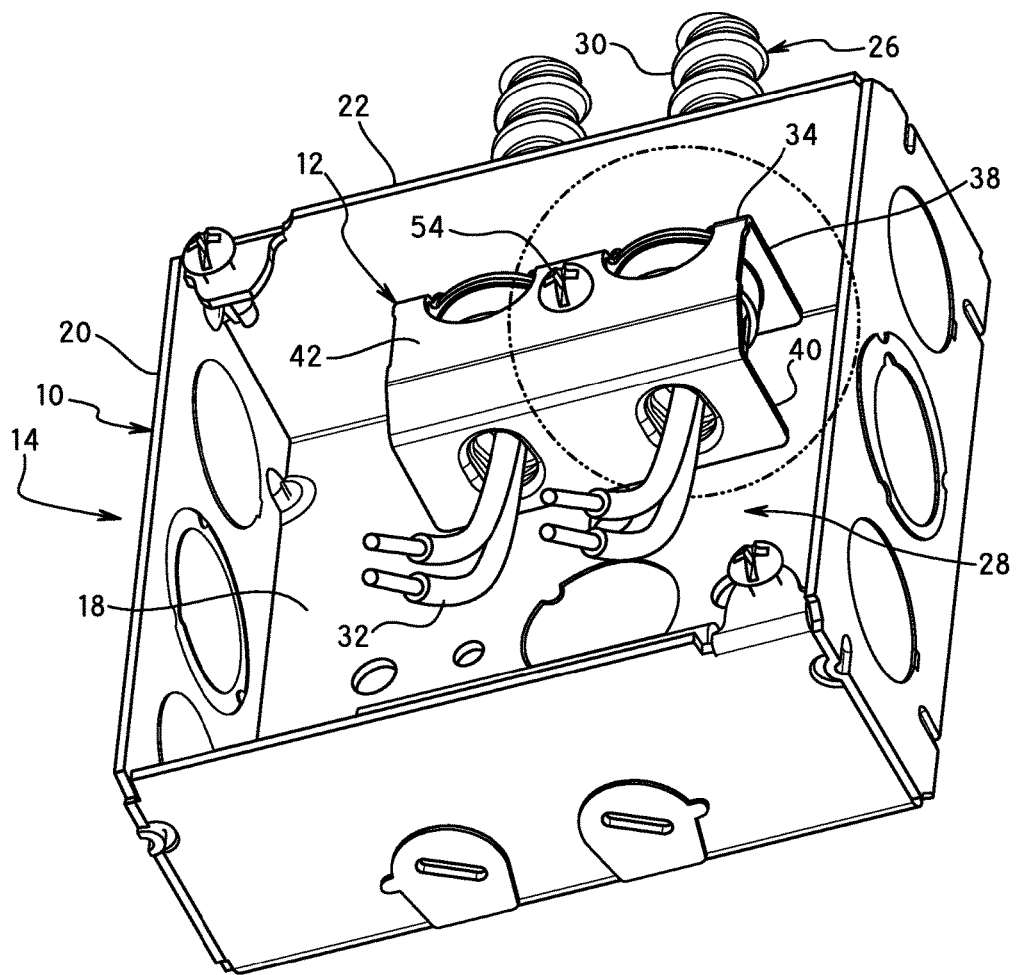
FIG. 1 is a perspective view of the electrical box and cable connector in a first embodiment of the invention.
Figure 2:
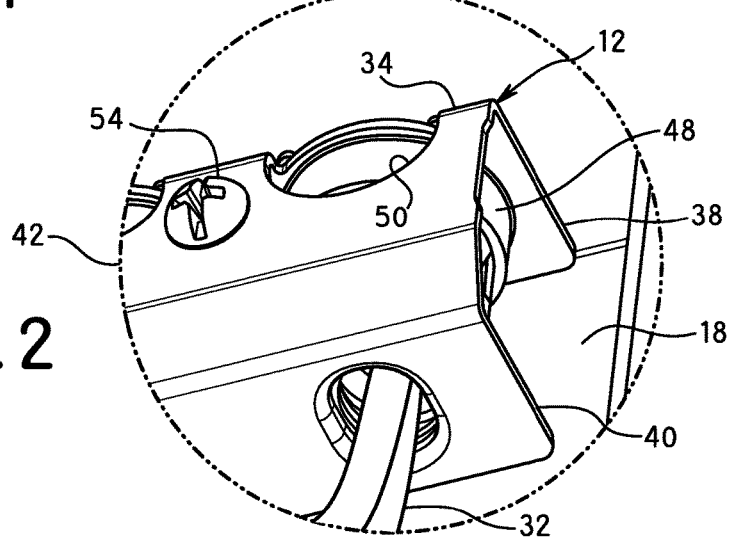
FIG. 2 is a partial enlarged view of the cable connector.
Figure 9:
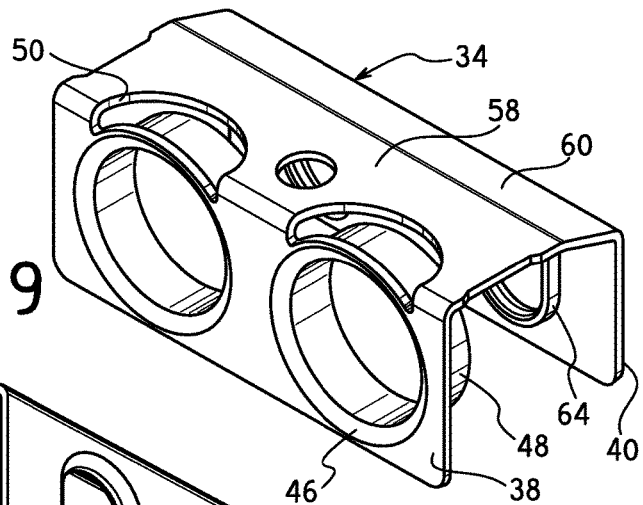
FIG. 9 is a front perspective view of the housing of the cable connector.
Figure 10:
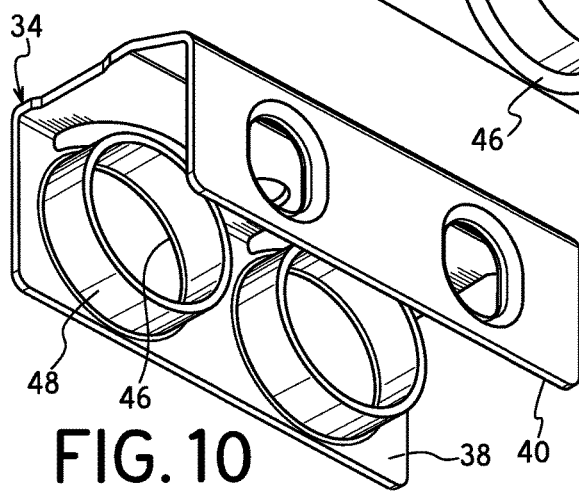
FIG. 10 is a rear perspective view of the housing of the cable connector.
Figure 11:
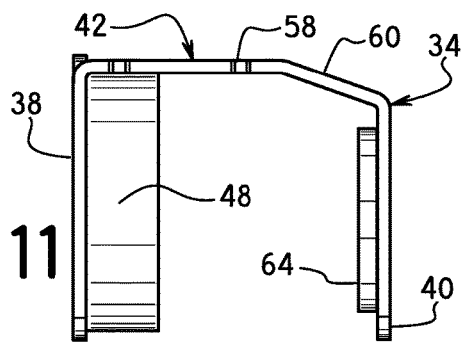
FIG. 11 is a side view of the housing of the cable connector.
Figure 12:
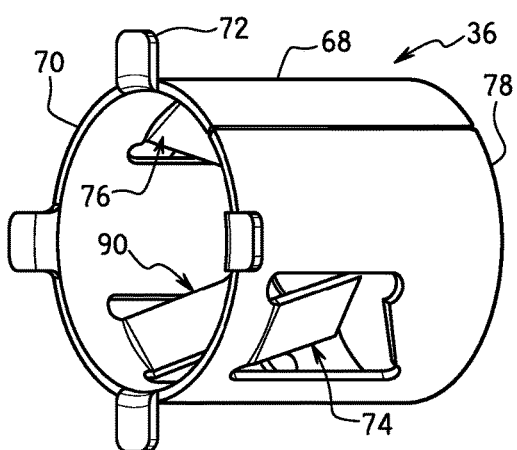
FIG. 12 is a front perspective view of the cable retainer of the cable connector.
Figure 13:
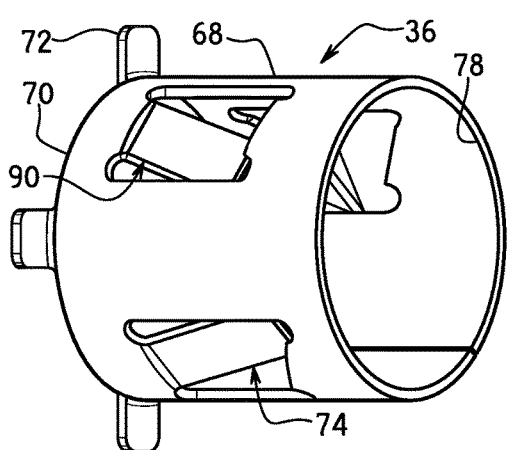
FIG. 13 is a rear perspective view of the cable retainer.

The invention is directed to an electrical box that includes a connector for electrical cable such as metal clad armor cables. The connector of the invention avoids the use of separate connectors that are often required for coupling metal clad, armor and non-metallic cables to an electrical box. Electrical codes require the use of some form of connector for securing the cables to the electrical box. In one embodiment the invention is directed to an electrical box having a cable connector preassembled with the electrical box or as a fixed part on the electrical box to avoid the need for separate connectors or handling of separate connectors during installation.

The present invention is directed to a cable connector and to a preassembled electrical box assembly having a cable connector as a fixed part on the electrical box to avoid the need to install separate connectors. The cable connector of the invention can be attached to the electrical box in a preassembled form for use by an electrician without the need to install the cable connectors on the job site. In one embodiment, the cable connector is fixed to the electrical box by screws, coupling tabs, welding, rivets or other suitable fastening means for attaching the cable connector to the electrical box during the manufacture of the electrical box.

In one embodiment of the invention as shown in FIGS. 1-17, the electrical box 10 includes a cable connector 12 that is coupled to the electrical box 10 to form the electrical box assembly 14. The electrical box 10 is typically made from steel by joining the various pieces together or by deep drawing and cutting and bending a blank into the finished shape as known in the art. In other embodiments, the electrical box can be made of a non-metallic material. The cable connector is typically made of steel and includes components that are sufficiently resilient to allow a cable to pass through the cable passage and grip the outer surface of the cable.

The electrical box 10 is constructed in a manner similar to a conventional electrical box by having an open top, a rear wall 18 and one or more side walls 20 extending from the rear wall 18 to define an open front 22. The side walls 20 have one or more knock-outs to form an opening for the electrical wires. In the embodiment shown, the electrical box 10 has opposite side walls and opposite connecting walls to form a substantially square shape where the electrical box has a suitable dimension and shape for receiving the electrical device and the desired number of electrical cables and wires. In other embodiments, the electrical box can have a rectangular, hexagonal, round or other suitable shape.

In the embodiment shown, the side wall 20 has at least one and preferably two cable openings 24 extending through the side wall 20 for feeding the electrical cable 26 to the interior cavity 28 of the electrical box 10. In the embodiment shown, the two cable openings 24 extend through the side wall 20 and are positioned next to or adjacent each other although the orientation of the cable openings can vary depending on the intended use.

The electrical box 10 and the cable connector 12 can be preassembled as a single, one-piece integrally formed unit or assembly for installation by the electrician without the need for attaching separate connectors to the cable and/or the electrical box during installation. The invention is particularly suitable for use with metal clad cables or corrugated spiral metal clad cables as shown having an outer armor sheath 30 and electrical conducting wires 32.

The cable connector 12 can be coupled to the electrical box 10 at the time of manufacture in a manner to prevent separation of the cable connector 12 from the electrical box 10 during normal use. The cable connector 12 is attached to the electrical box with the cable connector aligned with the respective cable openings 24. In the embodiments shown in FIG. 1, the cable connector 12 is attached to the rear wall 18 of the electrical box 10 next to the cable openings in the side wall 20. In alternative embodiments, the cable connector 12 can be connected to the electrical box 10 through the side wall 20 in a suitable manner.

Referring to the drawings, the cable connector 12 includes a housing 34 and a cable retainer 36 defining an insert received within the housing 34. The housing 34 in the embodiment of FIGS. 1-17 include a front wall 38, a rear wall 40, and a connecting wall 42 extending between the front wall 38 and the rear wall 40. The front wall 38 and the rear wall 40 in the embodiment shown are oriented substantially parallel to the side wall 20 of the electrical box 10 and extend downwardly from the top wall 42 to form an internal cavity with an open bottom end 44. In other embodiments, the housing can have a single wall with a cable opening where the wall is configured for coupling to the electrical box with the cable opening aligned with the cable opening in the electrical box. The cable retainer can be inserted into the opening in the wall of the housing or coupled to the wall fasteners, welding, tabs and the like. In the embodiments shown, the cable connector housing has a top wall extending between the front and rear walls. In other embodiments, the connecting wall can form a bottom wall for contacting or coupling with the bottom wall of the electrical box.

The front wall 38 in the embodiment shown in FIGS. 4-8 has at least one cable opening 46 for receiving an electrical cable 26. In the embodiment as shown in the drawings the front wall 38 has two adjacent openings 46 for receiving an electrical cable 26 The cable openings 46 include an inwardly extending collar 48 extending toward the rear wall 40 and into the internal cavity of the housing 34. Cutouts 50 are formed in the top wall 42 as shown in FIG. 4. A screw hole 52 is provided in the top wall 42 for receiving a mounting screw 54 that passes through the housing 34 and is threaded into a threaded aperture 56 in the rear wall 18 of the electrical box 10. In the embodiment shown in FIGS. 9-11, the top wall 42 has a first portion 58 oriented substantially parallel to the rear wall 18 of the electrical box 10 and perpendicular to the front wall 38 and the rear wall 40. A second inclined portion 60 extends between the end of the first portion 58 and the top edge of the rear wall 40.

The rear wall 40 is spaced from the front wall 38 a distance sufficient to receive the cable retainer 36 and the electrical cable 26 as shown in FIGS. 3 and 4. The rear wall 40 has cable openings 62 aligned with the cable openings 46 in the front wall 38. Typically, the cable openings 62 in the rear wall 40 have a dimension slightly smaller than the cable openings 46 in the front wall to allow the wires 32 to pass though and to prevent the armor sheath 30 from passing through the rear wall. In the embodiment shown in FIGS. 4-8, the cable opening 62 has an oblong or oval shape. The cable openings 62 are punched and cut from the rear wall 40 to form an inwardly extending collar 64 as shown in FIG. 4 to form a rounded surface to prevent damage to the plastic sheath around the electrical wires 32.

The opening 46 in the front wall 38 is aligned with the opening 62 in the rear wall 40 to define a passage extending between the front wall 38 and the rear wall 40 for receiving the electrical cable 26 and the cable retainer 36. The opening 46 in the front wall 38 has a dimension to allow the outer sheath of the cable 26 to pass through.

The cable retainer 36 in the embodiment shown in FIGS. 12-17 has a substantially cylindrical configuration and is made from a one piece metal blank that is cut and folded to the shape shown in the drawings. The cable retainer 36 has a cylindrical body 68 with a dimension to pass through the cable opening 46 in the front wall 38 and to be received within the collar 48 as shown in FIG. 3. Preferably the body 68 has a width and a height greater than the openings 62 in the rear wall. The body 68 has a front edge 70 with a plurality of tabs 72 extending radially outward from the front edge 70 a distance sufficient to contact the outer surface of a front wall 38 when the cable retainer 36 is inserted into the housing 34. The tabs 72 prevent the cable retainer 36 from sliding past the front wall 38. As shown in FIG. 3, the body 68 has a length such that the rear edge of the body 68 is spaced inwardly from the rear wall 40. In the embodiment shown, the body 68 has an axial length less than the spacing between the front wall 38 and the rear wall 40.

In one embodiment, the cable connector 12 is attached to the rear wall of the electrical box as shown in FIG. 3 with the front wall 38 spaced closely to the side wall 20 of the electrical box so that the cable retainer 36 is retained within the housing 34. The side wall 20 of the electrical box prevents the cable retainer 36 from sliding out of the collar 48 of the housing 34. The cylindrical body 68 and the tab 72 have an outer dimension greater than the dimension of the cable openings 24 in the side wall 20 so that the cable retainer 36 cannot pass through the cable openings 24 in the electrical box 10 thereby capturing the cable retainer 36 between the housing 34 of the cable connector 12 and the side wall of the electrical box 10. As shown in FIG. 3, the tabs 72 of the body 68 are positioned between the side wall 20 of the electrical box 10 and the front wall 38 of the housing 34 to limit axial movement of the cable retainer 36 with respect to the housing 34. In other embodiments, he cable retainer 36 can be coupled to the front wall, rear wall or top wall by a suitable fastening system, such a welding, rivets, press fitting, screw or bendable tabs.

In the embodiment shown, the cable retainer 36 is configured to retain the electrical cable 32 and prevent removal of the electrical cable from the electrical box 10. The cable retainer 36 has at least one arm that projects into the cable passage of the cable retainer to engage the outer surface of the cable 32. In one embodiment, the arm is oriented to enable the cable 32 to be manually inserted through the opening in the electrical box 10 and through the cable passage of the cable retainer. The arm grips the cable to prevent removal from the electrical cable once the cable in inserted. The cable retainer 36 as shown in FIGS. 12-17 has inwardly extending arms 74 and 76 for engaging the outer surface of the armor cable. The arms 74 and 76 are cut from the side portions of the cylindrical body 68 and bent inwardly at an inclined angle converging from the front edge 70 of the cylindrical body 68 towards the rear edge 78 and toward the center axis of the cylindrical body 68. The retaining arm 74 includes a first leg 80 bent inwardly into the axial passage of the cylindrical body 68. The first leg 80 is spring biased with respect to the body 68. The retaining arm 74 includes a second leg 82 extending from an end of the first leg 80 and bent inwardly towards the center axis of the body 68 with respect to the longitudinal dimension of the first leg 80. The second leg 82 has an inclined end edge 84 formed at an angle corresponding to the curvature of the corrugations of the armor clad cable 26.

Figure 14:
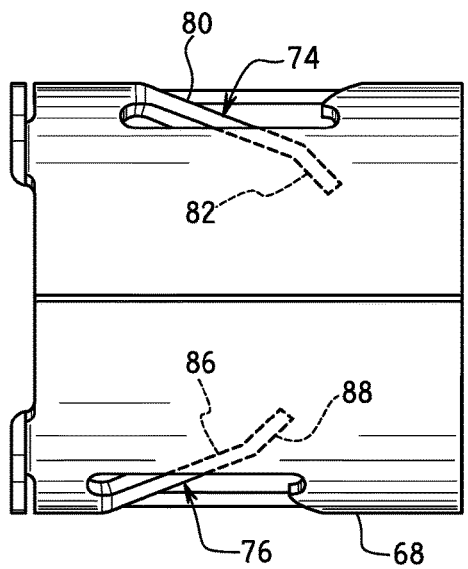
FIG. 14 is a bottom view of the cable retainer.
Figure 15:
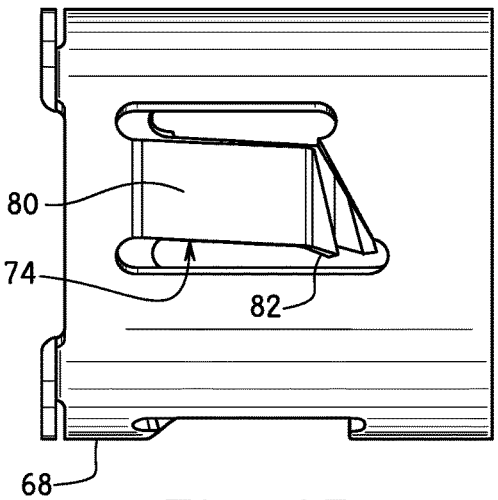
FIG. 15 is a side view of the cable retainer.
Figure 16:
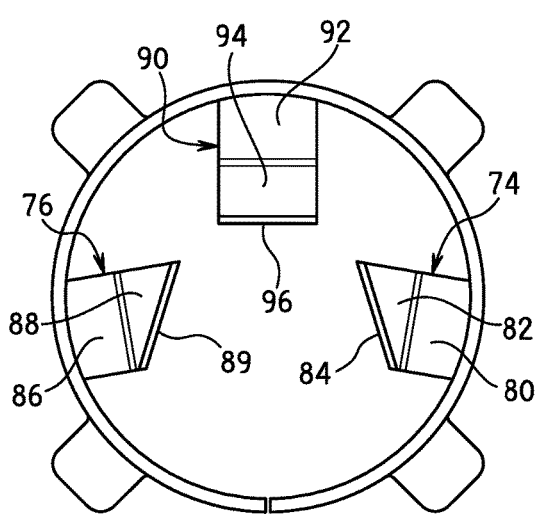
FIG. 16 is a front end view of the cable retainer.
Figure 17:
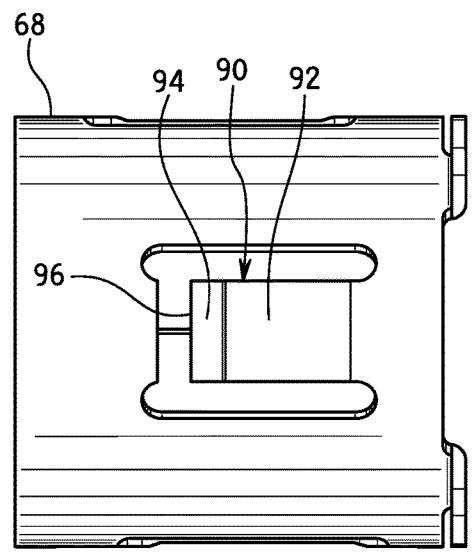
FIG. 17 is a top view of the cable retainer.
Figure 18:
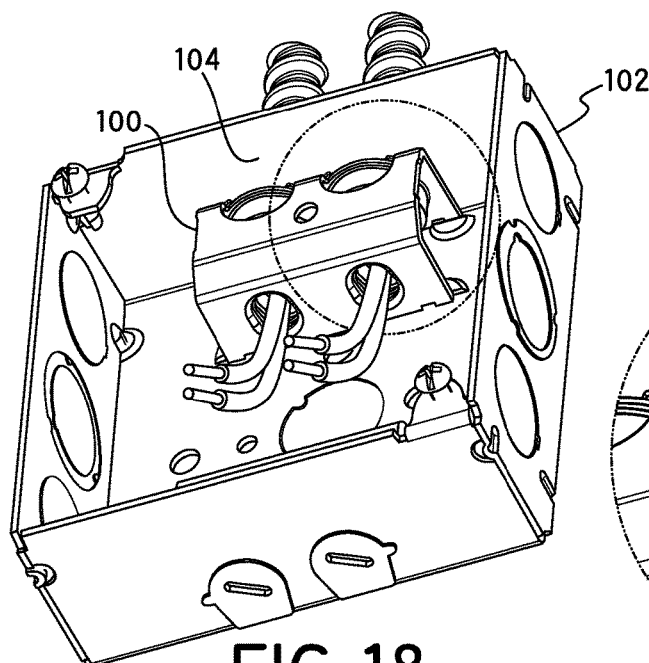
FIG. 18 is a perspective view of the electrical box and cable connector in a second embodiment of the invention.
Figure 19:
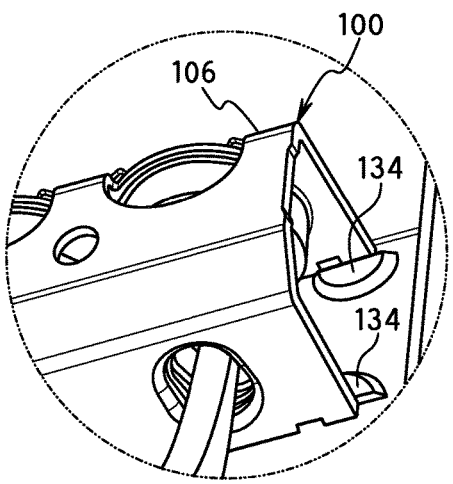
FIG. 19 is an enlarged partial view of the cable connector.

The second arm 76 as shown in FIG. 16 is positioned opposite the first arm 74 and is angled toward the center axis of the cylindrical body 68. The arm 76 includes a first leg 86 extending from the front edge of the cylindrical body 68 toward the rear edge 78 and extending toward the center axis of the body so that the arms 74 and 76 converge toward the center axis of the body 68. A second leg 88 extends from an end of the first leg 86 and is bent inwardly with respect to the plane of the first leg 86 toward the center axis of the body 68. The second leg 88 has an end edge 89 formed at an inclined angle to grip the outer surface and corrugations of the armor cable. As shown in FIG. 14, the first arm 74 has a length slightly greater than the length of the arm 76 to effectively grip the spiraling corrugations of the armor sheath.

The top portion of the cylindrical body 68 between the arms 74 and 76 includes a downwardly extending arm 90 that projects inwardly toward the center axis of the cylindrical body 68. The arm 90 extends from the front portion 70 of the cylindrical body 68 toward the rear edge 78 and toward the center axis of the body to converge toward the distal ends of the arms 74 and 76. The arm 90 has a first leg 92 integrally formed with the cylindrical body 68 and extends inwardly with respect to the cylindrical body 68. The second leg 94 is coupled to the first leg 92 and extends at an inclined angle with respect to the first leg 92. The second leg is bent inwardly with respect to the plane of the first leg 92. In the embodiment shown, the end 96 of the second leg 94 is substantially perpendicular to the longitudinal axis of the arm 90. The ends of the arms 74, 76 and 90 converge toward the center of the cylindrical body 68 to contact the outer surface of the armor sheath to grip the armor sheath and couple the electrical cable to the cable connector 36 and the electrical box 10. The arms 74, 76 and 90 are formed from spring steel and are spring biased inwardly and are sufficiently flexible to allow the electrical cable to be inserted through the opening in the electrical box and the open front edge of the cylindrical body 68 so that the armor sheath 30 slides past the arms while the arms grip the cable to prevent removal of the cable from the electrical box 10.

In use, the cable connector 12 is attached to the rear wall 18 of the electrical box 10. The electrical cable 26 is inserted through the cable opening 24 so that the wires 32 pass through the cable opening 46 and the front wall 38 of the cable housing 34 and the armor sheath 30 passes through the open front end of the cable retainer 36. The armor sheath slides past the arms 74, 76 and 90 so that the ends of the arms engage the valleys between the corrugations of the armor sheath 30 to retain the electrical cable in a fixed position.

In another embodiment shown in FIGS. 18-26, the cable retainer 100 is coupled to the electrical box 10 next to or adjacent a side wall 104 of the electrical box 10. The electrical box 10 is substantially the same as in the previous embodiment FIGS. 1-17.

The cable connector 100 is similar to the previous embodiment and includes a housing 106 and a cable retainer 108. The cable retainer 108 is substantially the same as in the previous embodiment. The housing 106 includes a front wall 110 having cable openings 112 and an inwardly extending collar 114 surrounding each of the cable openings 112. The front wall 110 has a bottom edge 116 having a pair of coupling tabs 118. A rear wall 120 is spaced from the front wall 110 and includes wire openings 122 aligned with the cable openings 112 in the front wall 110. The rear wall 120 includes an inwardly extending collar 124 surrounding the wire openings 122 for guiding wires through the opening. The rear wall 120 has a bottom edge 126 for contacting the rear wall of the electrical box and is provided with one or more coupling tabs 128. As shown in FIG. 22, the coupling tabs 118 and 128 are integrally formed with the front wall 110 and the rear wall 120, respectively.

Figure 20:
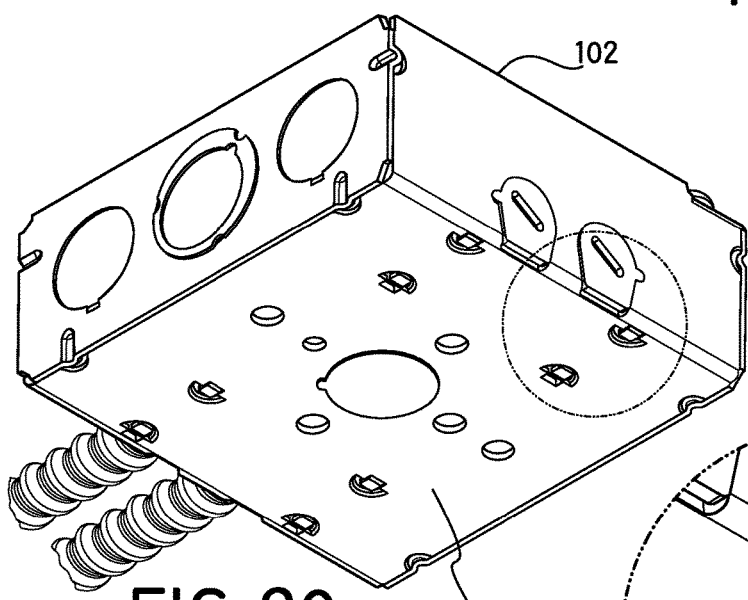
FIG. 20 is a bottom view of the electrical box showing the cable connector coupled to the electrical box.
Figure 21:
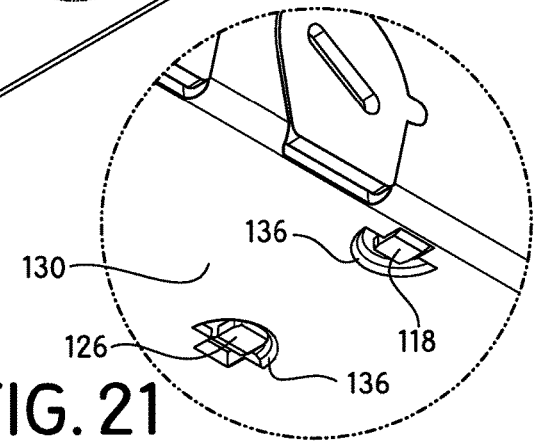
FIG. 21 is an enlarged view of the connection of the cable connector and electrical box.

Referring to FIGS. 20 and 21, the rear wall 130 of the electrical box 102 includes a plurality of spaced apart apertures 132 positioned for receiving the coupling tabs. The rear wall 130 is formed with an embossed portion 134 forming a recess 136 in the bottom face of the rear wall 130. The recess 136 has a dimension to receive the ends of the coupling tabs. The coupling tabs of the housing 106 are inserted through the corresponding apertures 132 and bent 90° as shown FIGS. 20 and 21 to couple the housing 106 to the rear wall of the electrical box 10. The coupling tabs 118 and 128 are bent into the recess 136 so that the coupling tabs do not project beyond the bottom face of the rear wall and are substantially flush or slightly recessed with respect to the bottom face of the rear wall.

The cable retainer 108 is positioned in a manner similar to the previous embodiment and is captured between the side wall of the electrical box and the housing 106. The coupling tabs 118 and 128 eliminate the need for the coupling screw to permanently couple the cable connector 100 to the electrical box 12. The cable is inserted through the opening in the electrical box so that the armor sheath couples to the arms of the cable retainer 108 and the wires pass through the opening in the rear wall 120 of the housing 106 in a manner similar to the previous embodiment.

Figure 27:
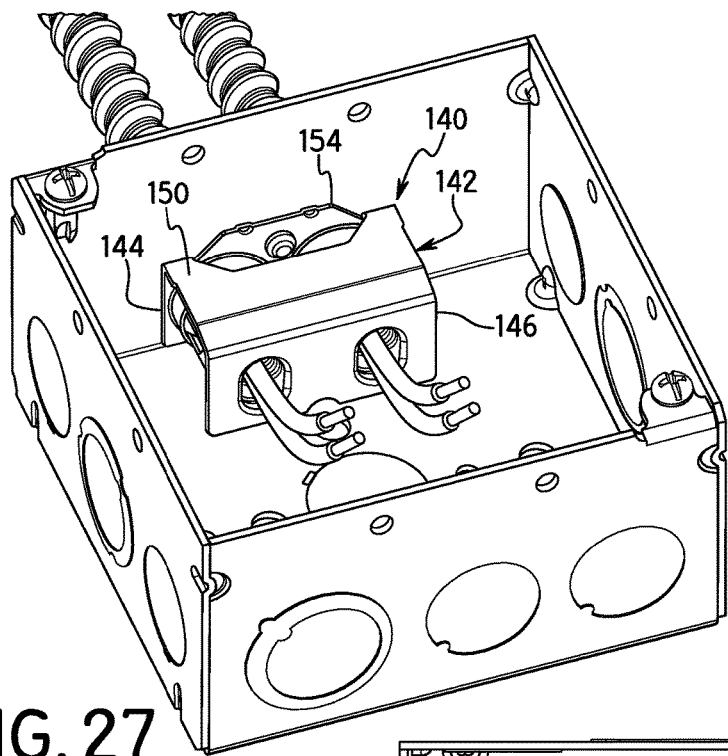
FIG. 27 is a perspective view of another embodiment of the invention.
Figure 28:
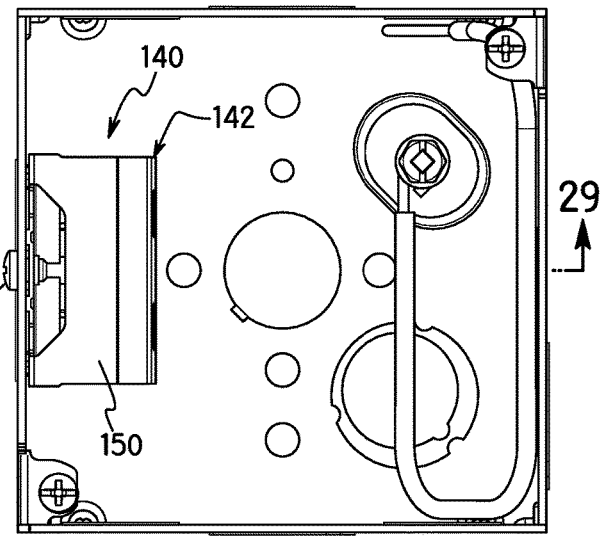
FIG. 28 is a top view of the electrical box in the embodiment of FIG. 27.
Figure 29:
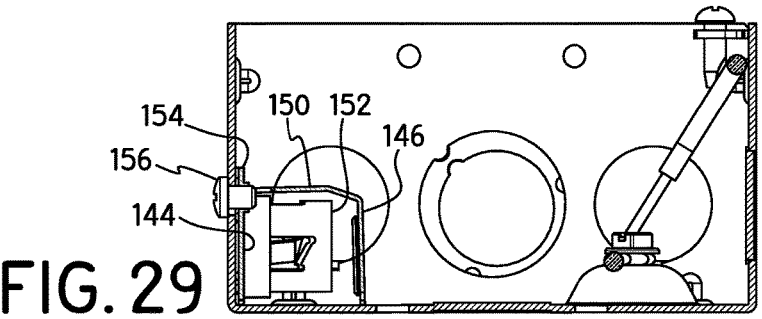
FIG. 29 is cross sectional view taken along line 29-29 of FIG. 28.

In a further embodiment shown in FIG. 27-29, the cable connector 140 is coupled to the sidewall of the electrical box 10. The cable connector 140 is similar to the previous embodiments where the cable connector has a housing 142 with a front wall 144 with cable openings, a rear wall 146 with cable openings and a top wall 150. A cable retainer 152 is received in the cable openings in the front wall 144 as in the previous embodiment. The cable retainer 152 is substantially the same as in the embodiment of FIGS. 1-17.

The front wall 144 of the housing 142 is formed with a flange 154 cut from the top wall 150. The front wall 144 includes a threaded screw hole for receiving a coupling screw 156. As shown in FIGS. 28 and 29, the screw 156 extends through an aperture in the sidewall of the electrical box 10 and threads into the screw hole in the front wall 144 to attach the cable connector 140 to the electrical box 10.

Figure 30:
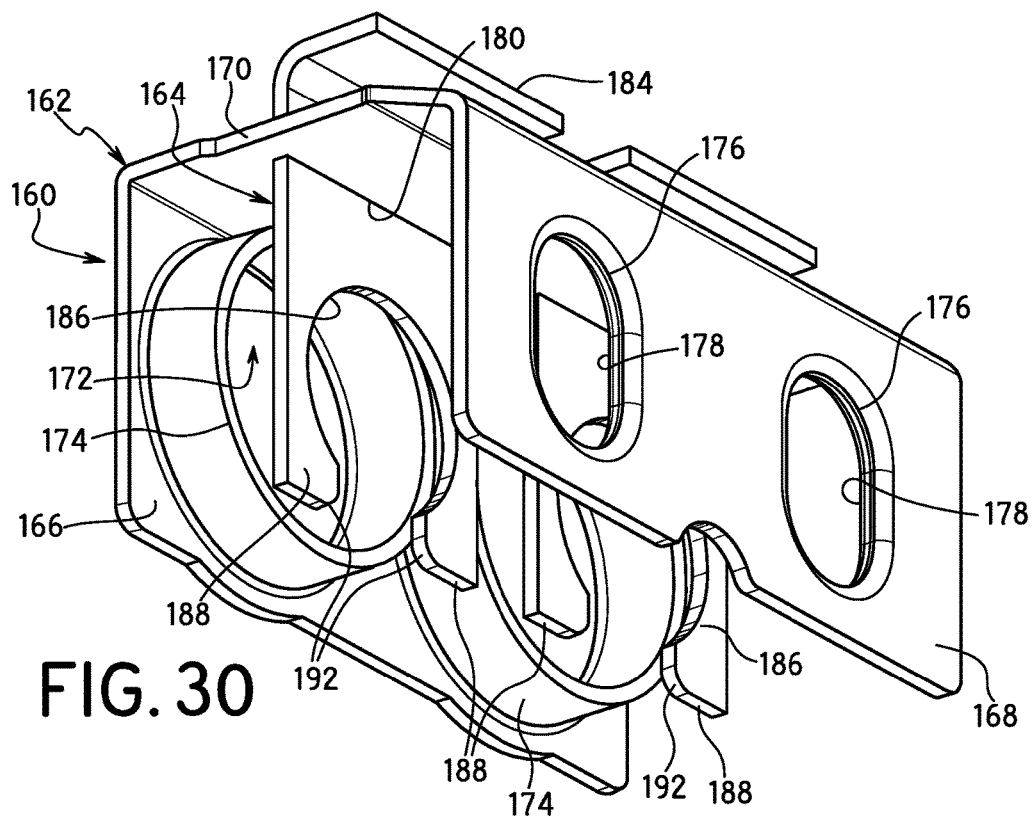
FIG. 30 is a perspective view of the cable connector in a further embodiment of the invention.
Figure 31:
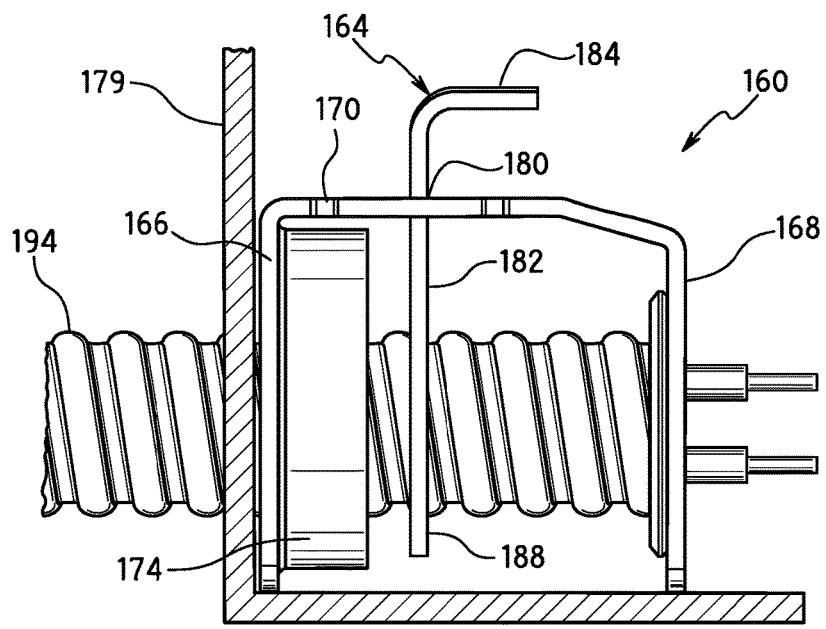
FIG. 31 is a cross sectional side view of the cable connector of FIG. 30.
Figure 32:
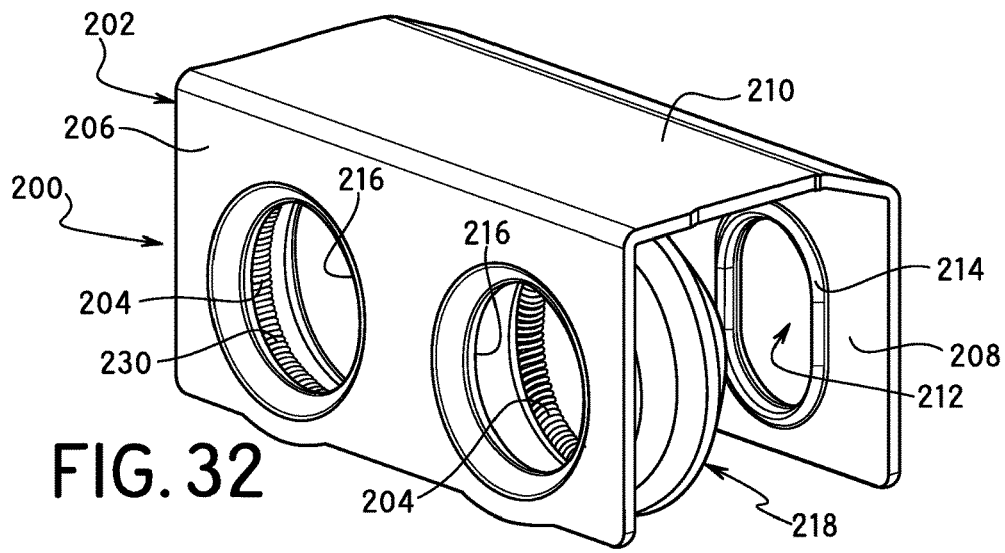
FIG. 32 is a perspective view of a further embodiment of the cable connector.

Referring to FIGS. 30 and 31 a further embodiment of the invention includes a cable connector 160 having a housing 162 and a cable retainer 164 received in the cable connector 160. The housing 162 includes a front wall 166, a rear wall 168 and a connecting wall 170 connecting the front wall 166 and rear wall 168. In this embodiment, the connecting wall 170 forms a top wall. The front wall 166 includes cable openings 172 having an inwardly extending collar 174 in a manner similar to the previous embodiment. The rear wall 168 includes cable openings 176 having an inwardly extending collar 178. The housing 162 can be coupled to the electrical box 179 by suitable fasteners. As in the previous embodiments, the housing 162 can be coupled to a side wall or bottom wall of the electrical box 179 by a fastener.

The connecting wall 170 extends between the front wall 166 and the rear wall 168 and is provided with a slot 180 forming an opening for the cable retainer 168. As shown in FIGS. 30 and 31, the slot 180 extends in a direction substantially parallel to the front wall 166 and spaced between the front wall 166 and rear wall 168.

Referring to FIG. 30, the cable retainer 164 has a first planar portion 182 and a second planar portion 184 forming an actuating flange. The first planar portion 182 has a cable opening 186 with a dimension for receiving the cable 194. The cable opening 186 is defined by spaced apart parallel arms 188. The arms 188 have a concave inner surface to define the substantially circular cable opening 186. Each arm 188 has an inwardly extending portion forming a tab 192 at a distal end of the arm. The inner edges of the tabs 192 are spaced apart a distance to be able to slide over the outer surface of the armor cable as shown in FIG. 31. The arms 188 are sufficiently flexible to bend outwardly as the distal ends slide over the outer surface of the armor cable 194.

In use the arms 188 slide within the respective slot 180 between a first outwardly extended position and a second position for engaging in the electrical cable 194 as shown in FIGS. 30 and 31. The arms 188 are moved to the extended position to retract the end of the planar portion 182 from the cable passage of the housing 162. The electrical cable 194 is inserted through the cable passage of the housing as in the previous embodiment to the position shown in FIG. 31. The cable retainer 164 is manually moved downward into the cable passage of the housing 162 so that the tabs 192 of the arms 188 slide over the armor sheath of the cable as shown in FIG. 31 to grip the cable 194 and retain the cable within the cable connector 160.

FIGS. 32-36 illustrate another embodiment of the invention for connecting an electrical cable to the electrical box and preventing removal of the electrical cable from the electrical box. In this embodiment of the invention, the cable connector 200 includes a housing 202 and a cable retainer 204. The cable connector 200 is mounted in an electrical box 234 next to or adjacent an opening in a side wall of the electrical box as in the previous embodiments. As in the previous embodiments, the housing 202 includes a front wall 206, a rear wall 208 and a top wall 210 extending between the front wall 206 and the rear wall 208.

The rear wall 208 has cable openings 212 with an inwardly extending collar 214. The front wall 206 also includes cable openings aligned with the cable openings 216 for defining a cable passage extending between the front wall and rear wall of the housing 202. A collar 218 extends inwardly from the respective opening 216 toward the rear wall 208. As shown in FIGS. 33-36, the collar 218 has a first portion 220 with a substantially cylindrical configuration extending from the front wall 206. The first portion 220 has a proximal end coupled to the front wall 206. The first portion 220 has an inner dimension greater than the dimension of the opening 216. As shown in the drawings, the opening 216 is defined by an annular lip 222 projecting radially inward relative to the inner surface of the first portion 220.

The collar 218 has a second portion 224 at the distal end of the first portion 220. As shown in the drawings, the second portion 224 has a substantially V-shape where the apex 226 of the V-shaped portion forms an annular recess 236 having an inner diameter greater than the inner diameter of the first portion 220.

In the embodiment shown, the collar 210 is integrally formed with the front wall 206. In other embodiments the collar 218 can be a separate member that is coupled to the front wall. By way of example, the collar 218 can be coupled to the front wall by tabs positioned between the front wall and the wall of the electrical box as in the embodiment of FIGS. 1-17. In other embodiments, the collar 218 can be coupled to the housing by welding, rivets, bendable tabs or other fastening systems.

Figure 33:
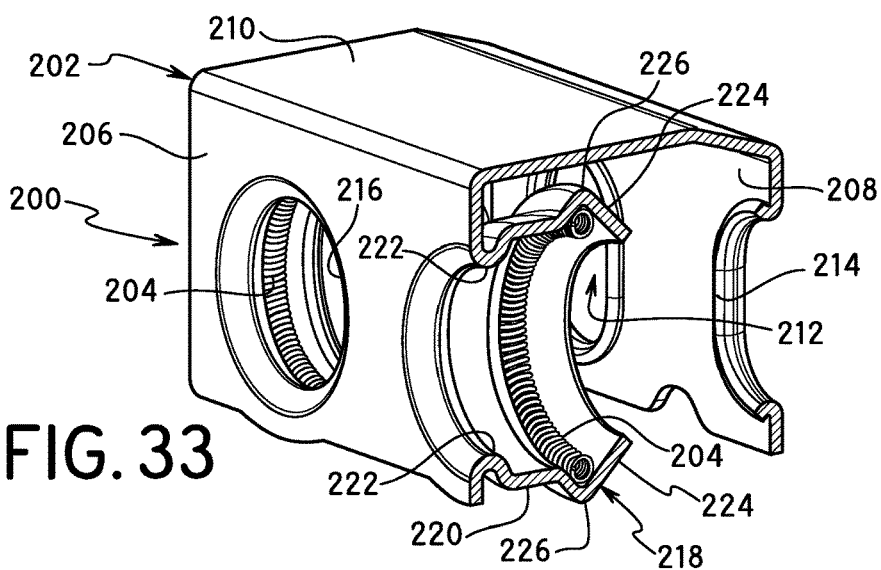
FIG. 33 is a cross sectional view of the cable connector of FIG. 32 showing the retainer spring in a first position.
Figure 34:
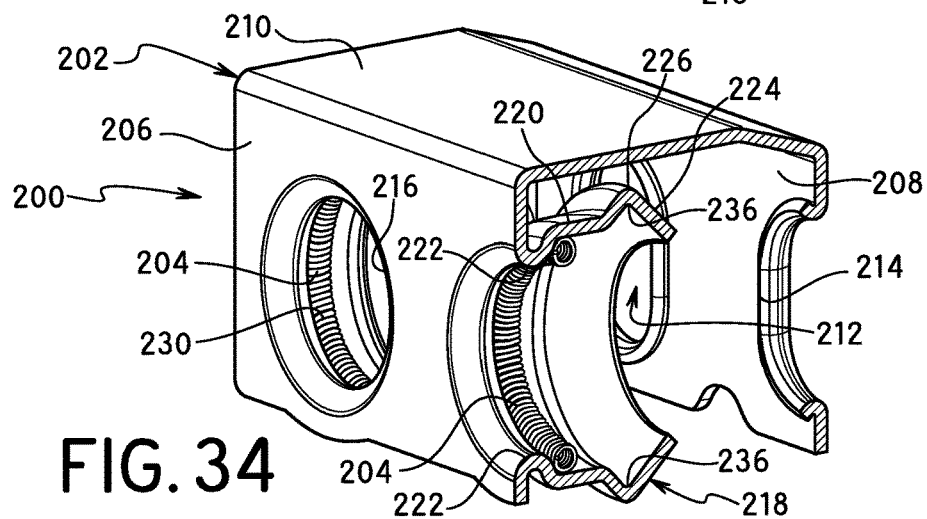
FIG. 34 is a cross sectional view of the cable connector of FIG. 32 showing the retainer spring in a second position.
Figure 35:
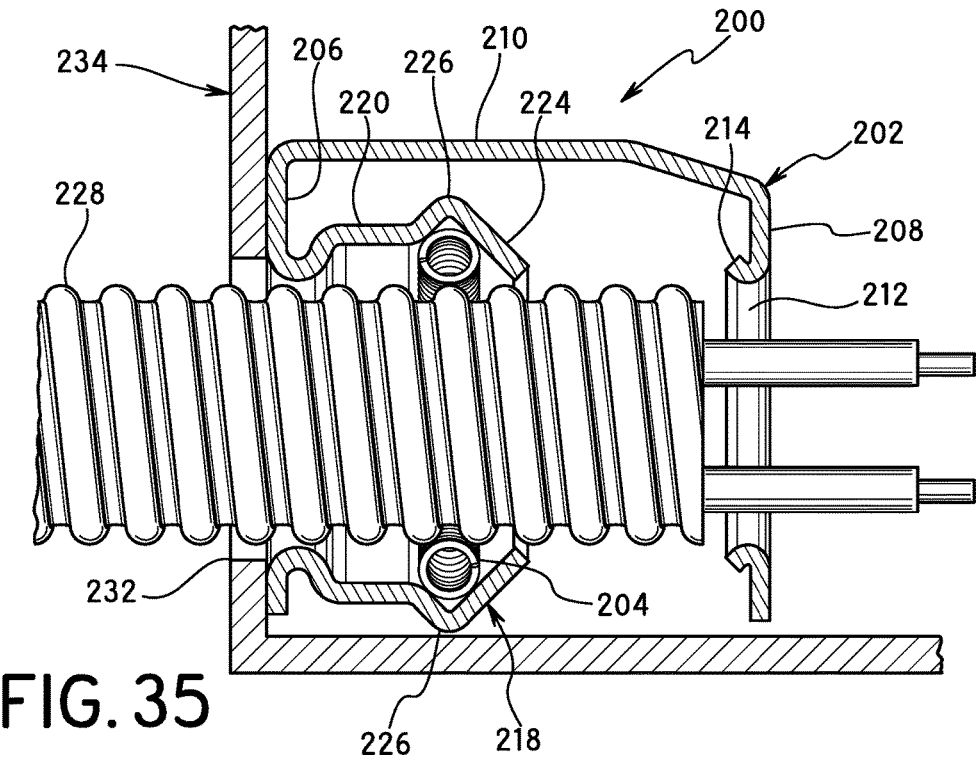
FIG. 35 is a cross sectional view showing the cable inserted into the cable connector.

The cable retainer 204 is received in the collar 218 for gripping the cable 228. The cable retainer 204 in the embodiment shown is an annular coil spring having a central opening 230 configured for gripping the outer surface of the cable. The cable retainer 204 is initially positioned in the recess 236 defined by the apex 226 of the second portion 224 as shown in FIG. 33 and FIG. 35. In this position, the cable 228 can be inserted through the opening 232 in the electrical box 234 as shown in FIG. 35. The cable retainer 204 positioned in the recess of the second portion 224 enables the cable to slide into the electrical box 234.

Figure 36:
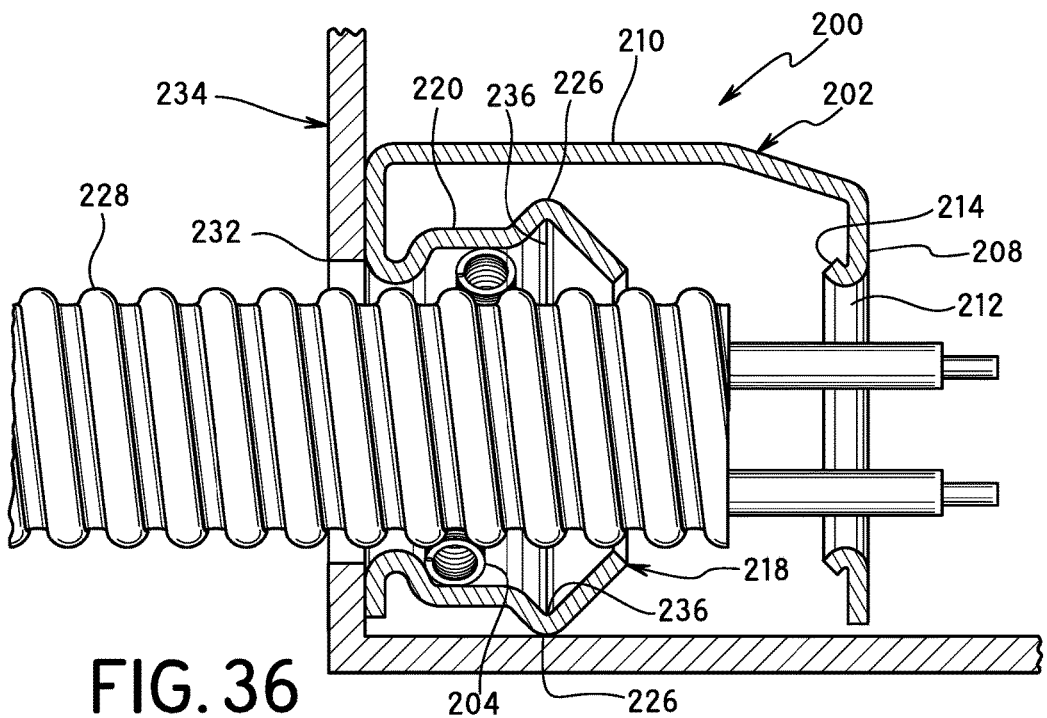
FIG. 36 is a cross sectional view showing the retainer spring contacting the cable.

In one embodiment of the invention, the inner diameter of the cable retainer 204 complements the outer diameter of the electrical cable 228 so that the cable retainer 204 contacts the outer surface of the cable 228 while allowing the cable 228 to slide through the cable connector 200. The cable retainer 204 can be received in the valleys between the armor cable 228 as shown in FIG. 35 and FIG. 36. By withdrawing the cable 228 from the cable connector 200, the cable retainer 204 is moved to the first portion 220 to apply an inward radial force on the outer surface of the armor cable 228 with the cable retainer 204 received in the valleys between the corrugations of the armor cable 228 thereby preventing further withdrawal of the cable from the cable connector 200 as shown in FIG. 36. The annular lip 222 serves as a stop member to prevent removal of the cable retainer 204 and retain the cable retainer in the recess formed by the first portion 220.

While various embodiments have been disclosed, it will be understood that various changes and modifications can be made without departing from the scope of the appended claims.

What is claimed is:

1. A cable connector for coupling a cable to an electrical box, said cable connector configured for mounting entirely within a cavity of the electrical box, said cable connector comprising:
   a housing having a cable opening forming a cable passage oriented for aligning with a cable opening in the electrical box, and a collar on an inner surface of housing, said collar having an axial passage; and
   a cable retainer coupled to said housing, said cable retainer having a cable opening for receiving and gripping an outer surface the cable within the cable passage of said housing, said cable retainer configured for sliding transverse to said cable passage between a first position where said cable retainer is not positioned in said cable passage and does not engage the cable, and a second position where the cable retainer is positioned in the cable passage of the housing and axial passage of said collar to grip the cable.

2. The cable connector of claim 1, wherein
   said housing has a front wall and a connecting wall extending from an end of said front wall, and where said cable retainer is connected to said connecting wall for sliding movement with respect to said connecting wall.

3. The cable connector of claim 2, wherein
   said connecting wall defines a top wall extending in a direction substantially parallel to a plane of the cable passage.

4. The cable connector of claim 2, further comprising
   a rear wall spaced from said front wall and having a cable opening aligned with said cable opening in said front wall, and said connecting wall extending between said front wall and rear wall.

5. The cable connector of claim 4, wherein said connecting member includes an opening for receiving said cable retainer whereby said cable retainer slides between said first position and said second position.

6. The cable connector of claim 5, wherein said cable connector has a substantially planar portion and said cable opening extends through said planar portion, and said cable opening has an open end, and where said opening in said connecting member is a slot configured for receiving said planar portion of said cable connector.

7. The cable connector of claim 1, wherein said cable retainer includes at least one arm configured for engaging and gripping the cable, and retaining the cable in the cable connector.

8. The cable connector of claim 1, wherein said cable retainer includes two opposing arms defining a cable opening between said arms, said arms configured for gripping opposite outer surfaces of said cable when said cable retainer is in said second position.

9. The cable connector of claim 8, wherein said arms have an inwardly extending tab, and where said cable opening is a substantially circular shaped opening.

10. The cable retainer of claim 8, wherein said housing has a wall with an opening for receiving said cable retainer, and where said cable retainer slides within said opening between said first position and said second position.

11. The cable retainer of claim 10, wherein said opening in said wall is a slot, and where said cable retainer has a planar body portion that slides within said slot.

12. The cable connector of claim 8, wherein said arms of said cable retainer have an end that are spaced-apart a distance to define an open area of said cable opening, said open area having a width less than a diameter of said cable opening.

13. The cable connector of claim 1, wherein said cable retainer includes planar body having a first arm having an end and a second arm having an end, said ends spaced-apart to form a gap therebetween and having width less than a diameter of said cable opening of said cable retainer.

14. An electrical box assembly comprising:
   an electrical box having a rear wall and a side wall, said side wall having at least one cable opening with a dimension for receiving a cable;
   a housing coupled to said electrical box and having a cable opening aligned with said cable opening in said electrical box and defining a cable passage for receiving the cable, said housing having a face with an opening; and
   a cable retainer received in said opening in said face of said housing and coupled to said housing for sliding movement, said cable retainer having a cable opening for receiving and gripping an outer surface of the cable within the cable passage of said housing, said cable retainer configured for sliding in said opening in said face of said housing in a direction substantially perpendicular to an axis of said cable passage between a first position where said cable retainer does not engage the cable and a second position where the cable retainer is positioned in the cable passage of the housing to grip the cable and receive the cable in the cable opening of the cable retainer.

15. The electrical box assembly of claim 14, wherein
   said housing includes a front wall and said face defines a connecting wall extending from an end of said front wall, and where said cable retainer is slidably connected to said connecting wall.

16. The electrical box assembly of claim 14, wherein
   said cable retainer has a plurality of arms for positioning in said cable passage of said cable connector when said cable retainer is in said second position.

17. The electrical box assembly of claim 16, wherein said arms of said cable retainer have an end that are spaced-apart a distance to define an open area of said cable opening, said open area having a width less than a diameter of said cable opening.

18. The electrical box assembly of claim 14, wherein housing further comprises;
   a front wall, a rear wall, said face defining a connecting wall extending between said front wall and said rear wall to define said housing of said cable retainer, and where said cable retainer is positioned between said front wall and said rear wall.

19. The electrical box assembly of claim 18, wherein said cable retainer includes a first arm and a second arm spaced from said first arm a distance to slide over said cable in a transverse direction with respect to a longitudinal axis of the cable, and where said first arm and second arm are spaced-apart a distance to engage opposite sides of said cable.

20. The electrical box assembly of claim 18, wherein said connecting wall has an opening receiving said cable retainer whereby said cable retainer is movable between said first position and said second position with respect to said cable passage.

21. The electrical box assembly of claim 14, wherein said cable retainer includes planar body having a first arm having an end and a second arm having an end, said ends spaced-apart to form a gap therebetween and having width less than a diameter of said cable opening of said cable retainer.

22. A cable retainer for retaining a cable in an electrical box, said cable retainer comprising:
a housing having a front wall with an opening defining a cable passage extending through said front wall, a rear wall spaced from said front wall and having a cable opening aligned with said cable opening in said front wall, and a connecting wall extending between said front wall and rear wall; and
a cable retainer coupled to said connecting wall and being slidable between a first position where said cable retainer does not engage the cable and a second position where the cable retainer engages and grips the cable to retain the cable, said cable retainer including a first connecting arm and a second opposing connecting arm, each said connecting arm having an end and defining a substantially circular shaped cable opening between said arms, said arms configured for gripping an opposite side of an outer surface of said cable when said cable retainer is in said second position.

23. The cable retainer of claim 22, wherein said ends of said arms of said cable retainer define an open area of said circular shaped cable opening, said open area having a width less than a diameter of said circular shaped cable opening.

24. The cable retainer of claim 23, wherein said arms are sufficiently flexible to slide over an outer surface of the cable.

25. The cable retainer of claim 22, wherein said connecting wall has an opening receiving said cable retainer, and where said cable retainer moves within said opening between said first position and second position.

* * * * *